United States Patent [19]

Tumminaro

[11] 4,228,554
[45] Oct. 21, 1980

[54] TOILET FOR ANIMALS

[76] Inventor: Anthony J. Tumminaro, 4945 Holly View Dr., Vermilion, Ohio 44089

[21] Appl. No.: 25,912

[22] Filed: Apr. 2, 1979

[51] Int. Cl.³ .......................... E03D 1/00; E03D 3/00; E03D 5/00
[52] U.S. Cl. .......................................... 119/1; 4/300
[58] Field of Search .................. 4/142, 138, 141, 300, 4/301, 1, 420, 422; 119/1

[56] References Cited

U.S. PATENT DOCUMENTS

| | | | |
|---|---|---|---|
| 2,133,416 | 10/1938 | Bantz | 4/DIG. 5 |
| 2,584,656 | 2/1952 | Anderson | 119/1 |
| 3,329,974 | 7/1967 | Belasco | 4/142 |
| 3,603,290 | 9/1971 | Rork | 119/1 |
| 3,688,742 | 9/1972 | McGee | 119/1 |
| 3,747,563 | 7/1973 | Brockhouse | 119/1 |
| 3,757,738 | 9/1973 | Hall | 119/1 |
| 3,817,213 | 6/1974 | Chalmers | 119/1 |
| 3,827,401 | 8/1974 | Franzl | 4/1 |
| 3,921,582 | 11/1975 | Sedlmeir | 119/1 |
| 4,117,555 | 10/1978 | Dennis | 4/1 |

Primary Examiner—Henry K. Artis
Attorney, Agent, or Firm—Fay & Sharpe

[57] ABSTRACT

A toilet for animals includes a user platform on which an animal stands while eliminating body waste which passes through a generally central opening in the user platform. The upper surface of the user platform is inclined downwardly toward the central opening at a shallow angle and a flushing arrangement provides flow of flushing liquid across the upper surface toward the central opening. A splash shield at the front end of the user platform is movable between a generally horizontal storage position and a generally upright operative position. The flushing arrangement provides flow of flushing liquid across the inner surface of the splash shield when the shield is in its storage position. A bowl positioned beneath the user platform receives animal body waste passing through the central opening in the user platform. The flushing arrangement works sequentially by first providing flow of flushing liquid across the upper surface of the user platform and then providing flow of flushing liquid to the bowl.

3 Claims, 10 Drawing Figures

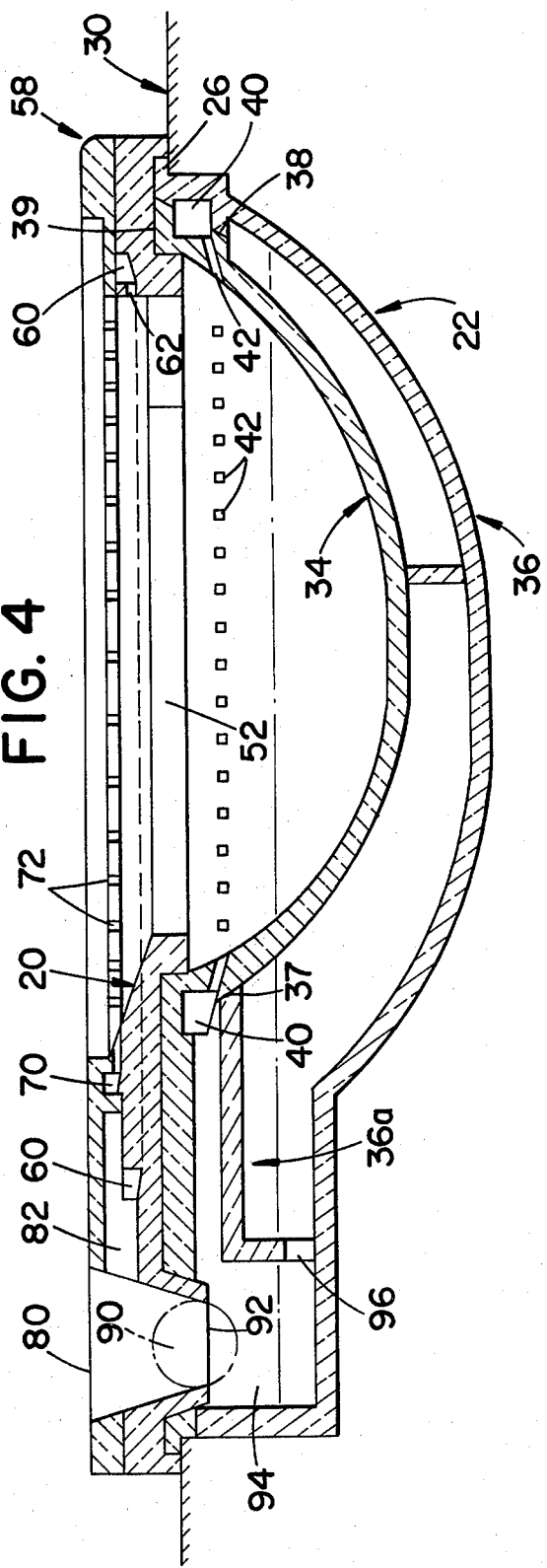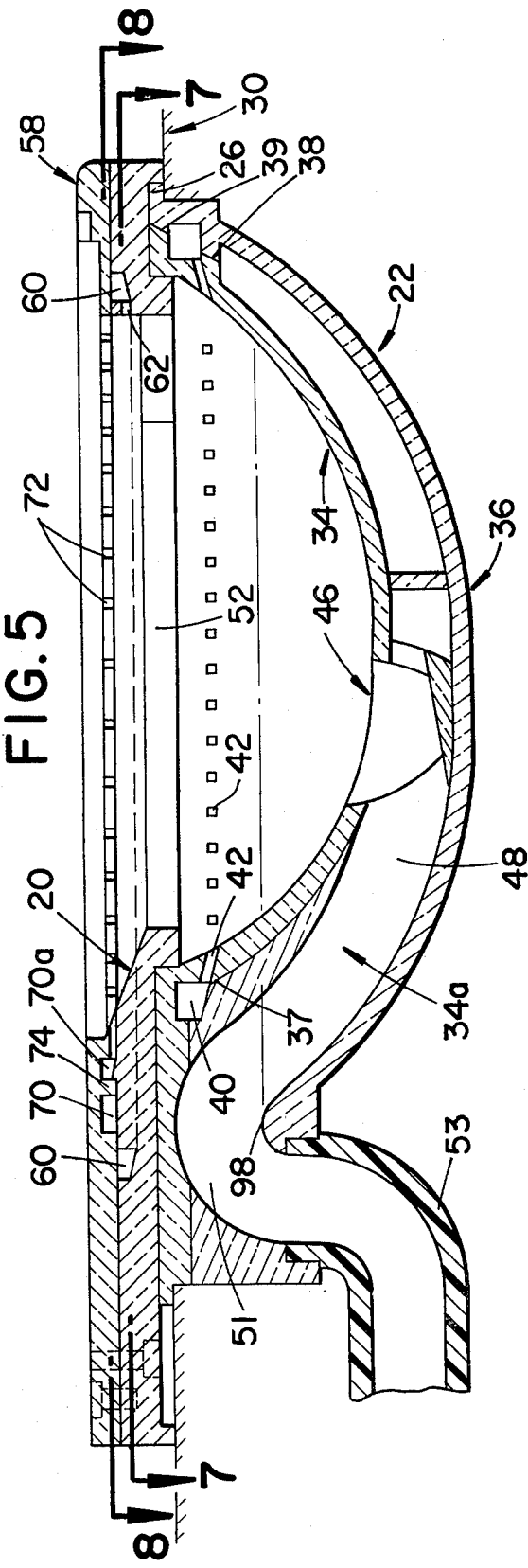

TOILET FOR ANIMALS

BACKGROUND OF THE INVENTION

This application relates to the art of toilets and, more particularly, to toilets for use by animals. Although the invention is particularly applicable for use by domestic pets, such as dogs and cats, it will be appreciated that certain aspects of the invention have broader utility and can be used with other toilets.

Previous toilets for use by animals have included types having elevated user platforms on which the animal must jump or climb. Such arrangements are extremely difficult for an animal to use because the animal does not have a sense of firm footing and security while eliminating body waste. Other arrangements have included enclosures which must be entered by the animal before eliminating body waste. Many animals are very reluctant to enter a confined enclosure because there is an inborn fear of being trapped. Other arrangements include a relatively large opening through which body waste material passes. A relatively large opening requires a high degree of dexterity in the animal to avoid falling into the opening.

It is desirable to have an animal toilet that provides stable footing at a low elevation, with a relatively small opening for receiving animal body wastes and provides a self-cleaning action to clean up after inaccurately deposited wastes.

SUMMARY OF THE INVENTION

It is a principal object of the present invention to provide a functionally sound, aesthetically pleasing and economically priced facility for the sanitary disposition of pet body wastes.

It is an additional object of the invention to provide an improved toilet which may be used by an animal without requiring a high degree of dexterity by the animal nor extreme difficulty in training the animal to use the toilet.

It is a further object of the invention to utilize existing water tank and bowl concepts, plus a special purpose self-cleaning user platform and urine deflector shield.

It is an additional object of the invention to provide an aesthetically pleasing animal toilet for installation in bathrooms of homes and apartments.

It is also an object of the present invention to provide a functionally sound and simplicity of design which will minimize manufacturing and installation costs.

A toilet for use by animals, such as dogs and cats, includes a user platform on which an animal stands while eliminating body waste. The user platform has an upper surface which is gradually inclined downwardly at a shallow angle toward a generally central opening through which waste material passes.

In a preferred arrangement, flushing means is provided for supplying a flow of flushing liquid across the upper surface of the user platform toward the generally central opening. This arrangement thoroughly cleans waste material from the upper surface of the user platform and enables the use of a smaller opening so that the animal will not be afaid of slipping through same.

In one arrangement, a splash shield is pivotally connected at the front end of the user platform for movement between a generally horizontal storage position and a generally upright operative position. The splash shield has an inner surface facing toward the opening in the user platform when the shield is in its upright operative position. The splash shield is preferably cupped such that the inner surface thereof is inwardly curved away from the opening in the user platform. The flushing means includes an arrangement for supplying a flow of flushing liquid across the inner surface of the splash shield in its storage position.

A bowl located beneath the user platform receives waste material passing through the opening in the user platform. The flushing means provides sequential flow of flushing liquid so that flushing liquid is first supplied across the upper surface of the user platform and is then supplied to the bowl.

The bowl includes an upper outwardly extending flange supportable on a supporting surface surrounding a hole receiving the toilet bowl. This places the upper surface of the user platform at substantially the same elevation as the supporting surface so that the animal does not have to jump or climb to use the toilet.

An upper band member is secured to the top of the user platform adjacent the outer periphery thereof. A liquid supply passageway is defined between the user platform and the band member. The passageway communicates with a source of flushing liquid and with a plurality of spaced holes which open outwardly for providing a flow of flushing liquid across the upper surface of the user platform.

BRIEF DESCRIPTION OF THE DRAWINGS

FIG. 4 is a partial cross-sectional elevational view taken generally on line 4—4 of FIG. 3;

FIG. 5 is a partial cross-sectional elevational view taken generally on line 5—5 of FIG. 3;

DESCRIPTION OF THE PREFERRED EMBODIMENTS

Figure 1:
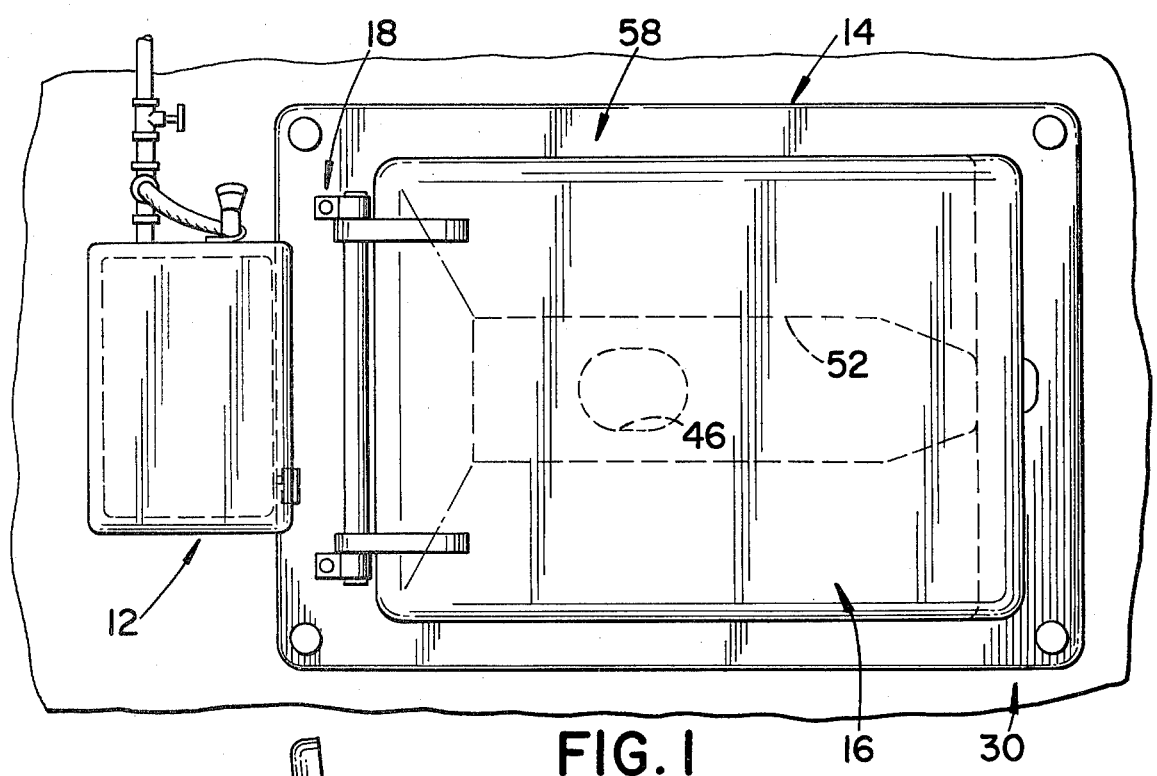
FIG. 1 is a top plan view of a toilet constructed in accordance with the present application.

Referring now to the drawing, wherein the showings are for purposes of illustrating a preferred embodiment of the invention only and not for purposes of limiting same, there is shown a toilet assembly including a flushing tank 12, a user platform 14, and a waste receiving structure 22. A cover member 16 is connected with user platform 14 by a hinge assembly 18 for movement of cover member 16 between a generally horizontal closed position shown in FIG. 1, and a generally open vertical position shown in FIG. 2 for enabling use of the toilet.

A user platform 20 is suitably secured to the upper peripheral edge of a bowl 22 having an outwardly extending upper peripheral flange 26 supportable upon a supporting surface 30 surrounding a hole in such surface through which bowl 22 is received. The hole in supporting surface 30 may be a hole in a floor or in a ground surface. The hole can be provided in a concrete pad or the like either indoors or outdoors.

It will be recognized that the various components of the improved toilet may be constructed of any suitable materials, including plastics or fired clay. Furthermore, combinations of various materials may be used for different parts. The various components of the toilet assembly will be secured together by the use of adhesives or by the use of suitable mechanical fasteners. Gaskets will be used between various parts as required.

Bowl 22 includes inner and outer bowl parts 34, 34a, 36 and 36a peripherally secured together around the joining lines generally indicated at 37, 38 and 39. A peripheral bowl passage 40 is defined between inner and outer bowl parts 34, 36 for supplying flushing liquid through a plurality of circumferentially spaced holes which communicate with bowl passage 40 and with the interior bowl 22. An opening 46 in the bottom of inner bowl part 34 communicates with a discharge passage 48 formed between inner and outer bowl parts 34, 36. Discharge passage 48 extends past a trap 51 for connection with a sewer pipe 53.

User platform 20 has an upper surface 50 which is inclined downwardly at a shallow angle from an outer peripheral portion toward a generally central opening 52. Upper surface 50 is preferably inclined downwardly at a relatively shallow angle not greater than around 20°. Generally central opening 52 is shown as a relatively narrow slot extending from front to back across user platform 20. The length of slot 52 from front to back of user platform 20 is substantially greater than the width thereof. This enables an animal to support itself on opposite sides of opening 52 by straddling same while eliminating body wastes. Upper surface 50 of user platform 20 is downwardly inclined on opposite sides of opening 52, and also at the rear of opening 52. The rear sloping portion is indicated at 50a and slopes at a steeper angle than the sloping portions on opposite sides of opening 52.

Figure 7:
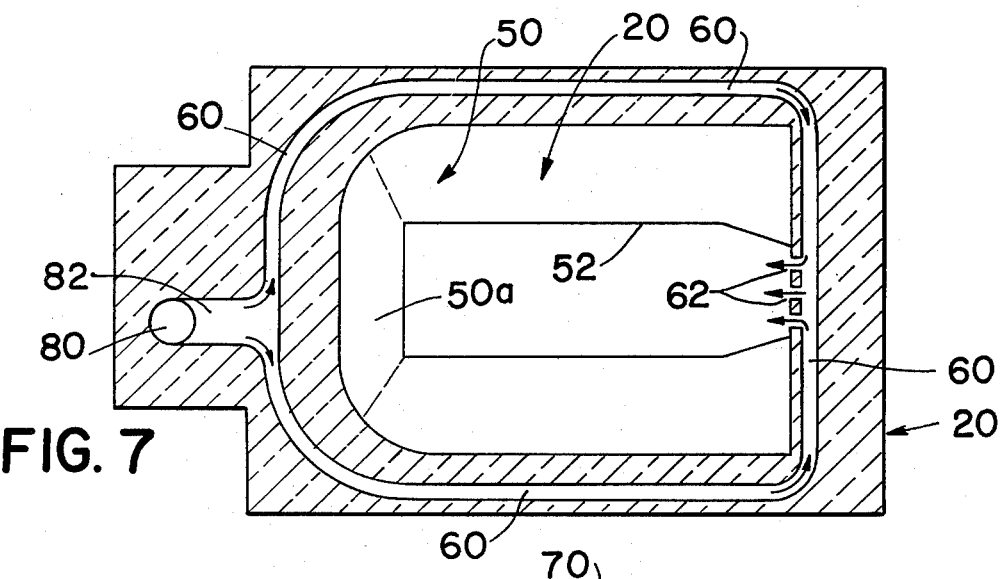
FIG. 7 is a partial cross-sectional plan view taken generally on line 7—7 of FIG. 5.

A band member 58 is secured to the top of user platform 20 adjacent the outer periphery thereof. A groove in the upper surface of user platform 20 is closed by band member 58 to form a flushing liquid supply passage 60 which is shown in FIG. 7 as supplying high velocity flushing liquid to a plurality of holes 62 opening outwardly generally horizontally at the front of user platform 20. Holes 62 are aligned with opening 52 in user platform 20.

Figure 8:
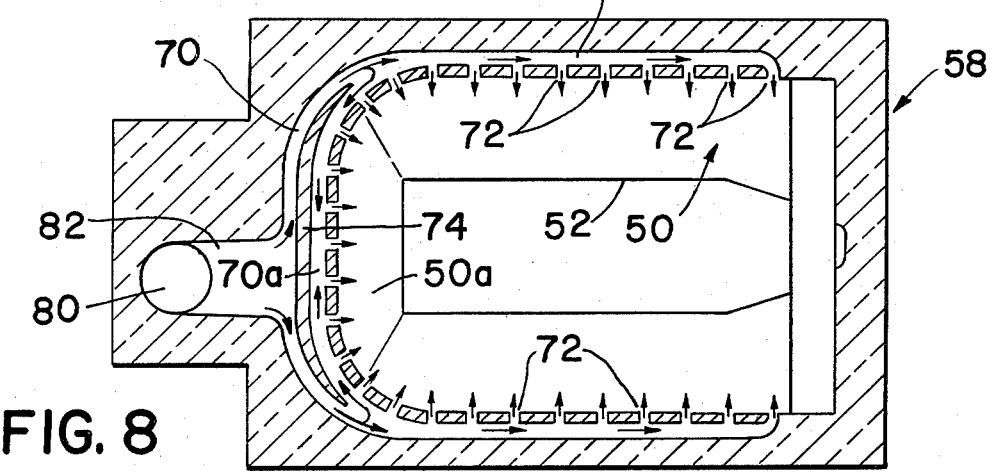
FIG. 8 is a partial cross-sectional plan view taken generally on line 8—8 of FIG. 5.

A groove in the underside of band member 58 is closed by cooperation with the upper surface of user platform 20 to define another flushing liquid supply passage 70 which is shown in FIG. 8 as supplying flushing liquid through a plurality of generally horizontal lateral holes 72 formed between user platform 20 and band member 58. Holes 72 open outwardly adjacent the outer peripheral portion of user platform 20 for providing a flow of flushing liquid across upper surface 50, 50a to sweep inaccurately deposited animal waste through opening 52. Flushing liquid supply passage 70 extends only along the upper opposite sides and the rear of user platform 20 as shown in FIG. 8. An upright barrier member 74 is positioned between the source of flushing liquid and passage rear portion 70a for providing a more even distribution of flushing liquid to all of the holes 72 around the sides and rear of the user platform.

As shown in FIG. 4, flushing liquid is supplied from the supply tank through an opening 80 and the liquid passes to a supply chamber 82 communicating with both passages 60 and 70. Upward displacement of a ball valve 90 opens another supply opening 92 for supplying flushing liquid to a supply chamber 94 communicating with bowl passage 40 and with a passage 96 leading to drain passage 48 below the normal water line at the bend of elbow 51 indicated at 98 in FIG. 5.

Figure 2:
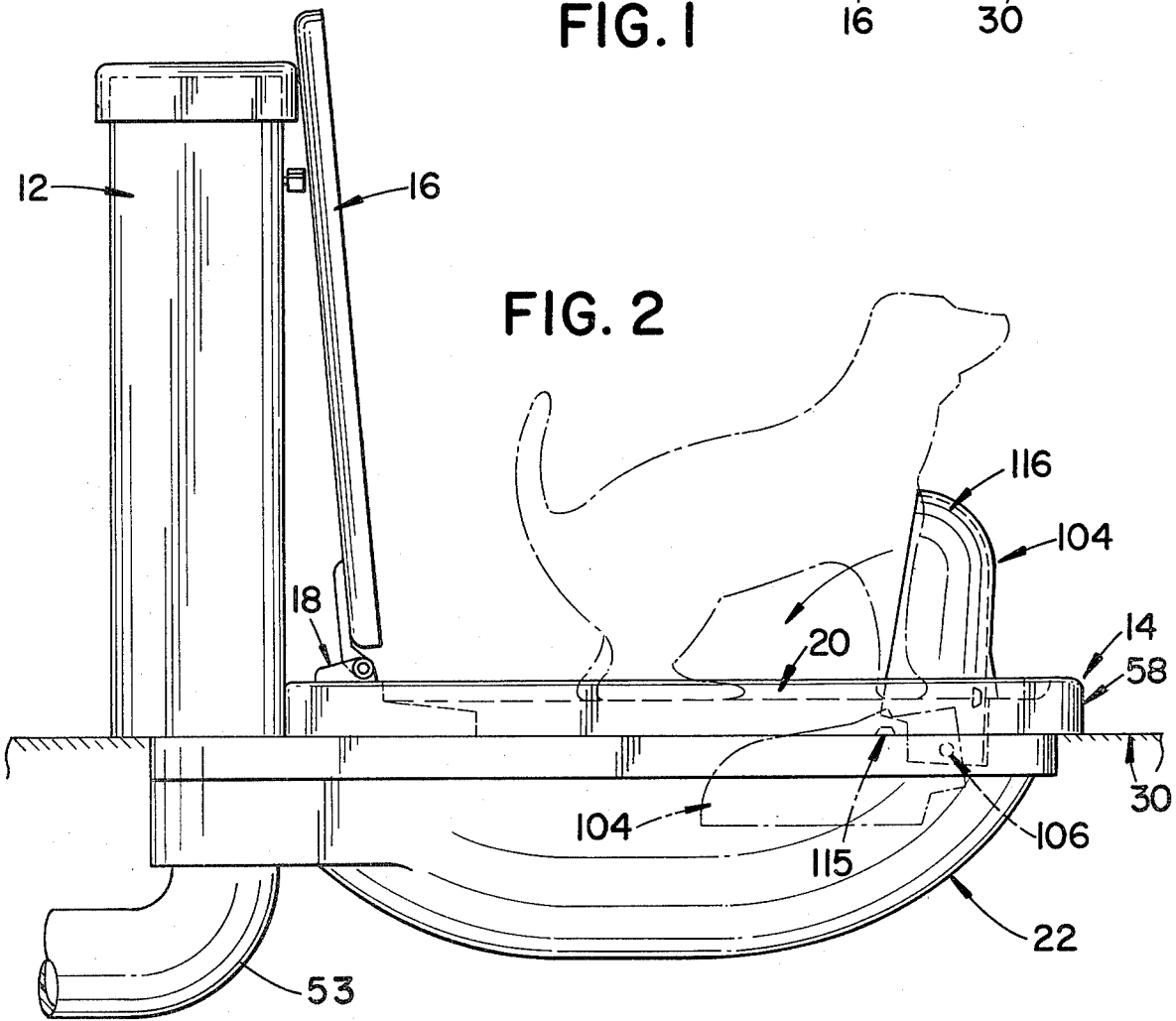
FIG. 2 is a side elevational view of the toilet of FIG. 1 being used by an animal.
Figure 3:
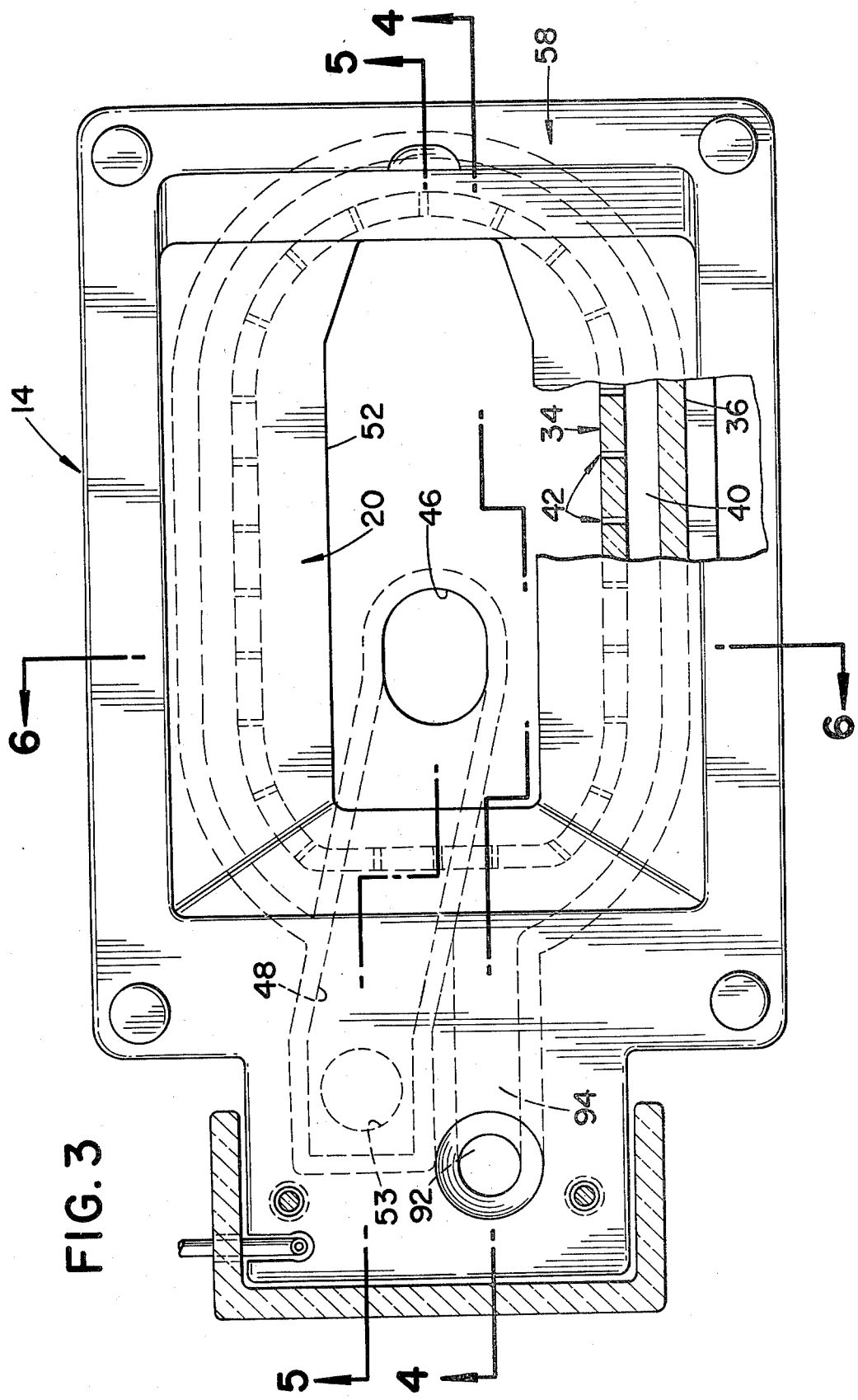
FIG. 3 is an enlarged top plan view with the toilet cover removed, and with portions cut-away for clarity of illustration.
Figure 6:
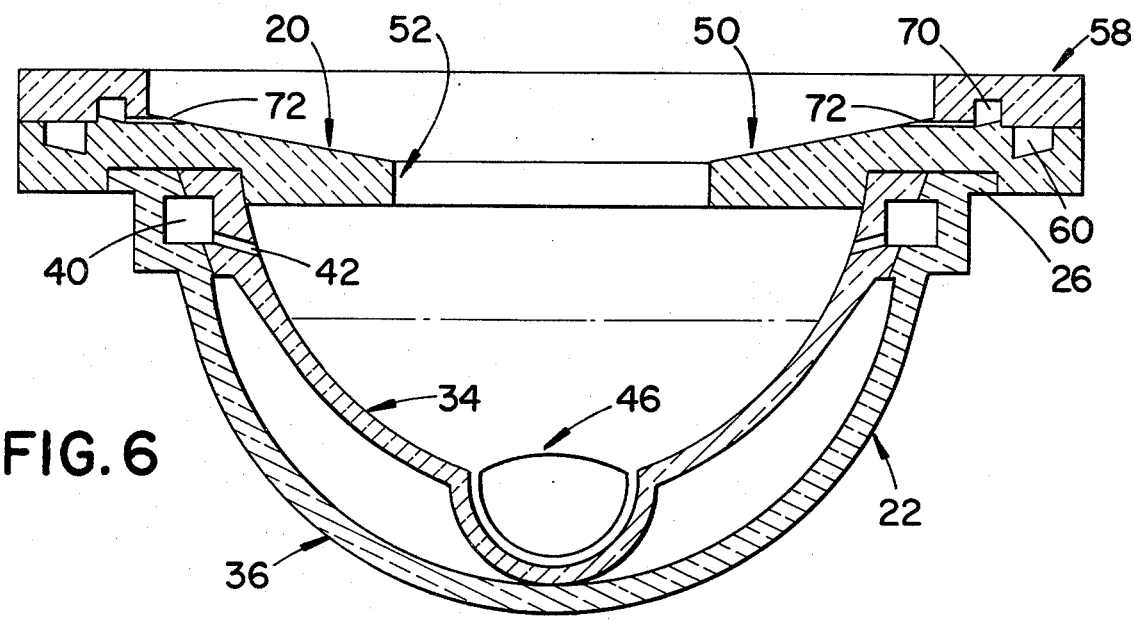
FIG. 6 is a cross-sectional elevational view taken generally on line 6—6 of FIG. 3.
Figure 10:
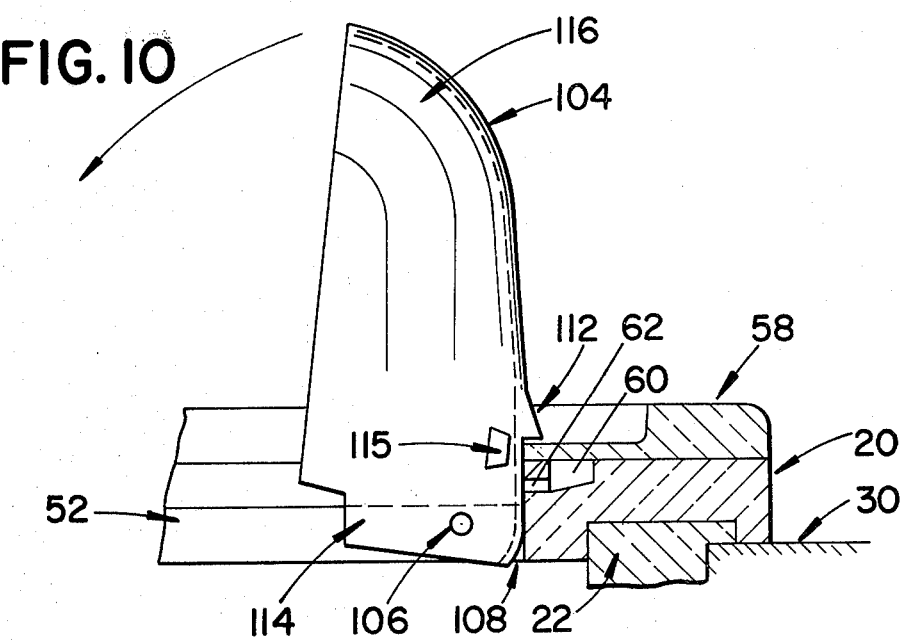
FIG. 10 is a partial enlarged side elevational view of a splash shield in its generally upright operative position.

A splash shield 104 is shown in FIGS. 2 and 10, and has opposite outwardly extending pins 106 receivable in suitable openings in user platform 20 for pivotally connecting splash shield 104 thereto. Splash shield 104 is suitably relieved as indicated at 108 in FIG. 10 for allowing pivotal movement thereof between a generally horizontal storage position shown in shadow line in FIG. 2, and a generally upright operative position. The splash shield is held rigid in an upright operative position when an outwardly extending abutment projection 112 on splash shield 104 engages an upper surface of band member 58 and edge 114 of the splash shield 104 engages an edge 52 of user platform 20. Splash shield 104 has an inner surface 116 facing generally toward opening 52 in user platform 20 when splash shield 104 is in its upright operative position. Splash shield 104 is cupped so that inner surface 116 is curved inwardly away from opening 52. Liquid splashed or directed against inner surface 116 of splash shield 104 is deflected downwardly for drainage through opening 52. In the generally horizontal storage position of splash shield 104 shown in shadow lines in FIG. 2, flushing liquid supply holes 62 of FIG. 10 are positioned for directing a flow of high velocity flushing liquid against and across inner surface 116 for thoroughly rinsing same. In its storage position shadow FIG. 2, splash shield 104 is received in opening 52 and is held in a rigid position just above the water line by depth retainer 115. Opening 52 will vary with size of pet but splash shield must always match opening size.

Figure 9:
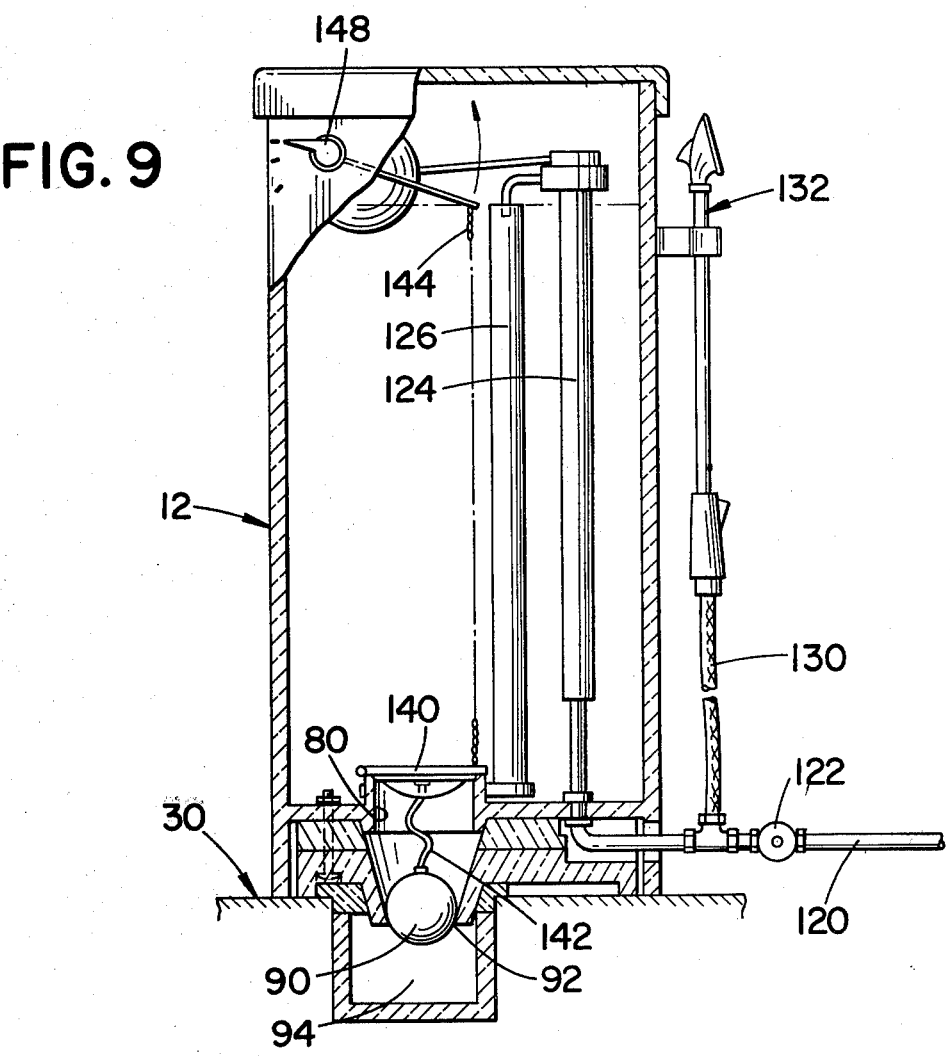
FIG. 9 is an elevational view of a flushing tank arrangement, and with portions cut-away for clarity of illustration.

FIG. 9 shows flushing liquid supply tank 12 which is supplied by flushing liquid through a conduit 120 past a valve 122. Flushing liquid is supplied within the tank through a supply tube 124 having a float operated valve in a conventional manner. An overflow tube 126 is also provided in a known manner. A flexible hose 130 connected with supply conduit 120 has a valved 26" extended spray head 132 for thoroughly cleaning the toilet and toilet area when required. Hook on top side of spray head to be used to collapse edge 114 of splash shield prior to returning splash shield to horizontal storage and cleaning position.

A flapper valve 140 normally closes flushing liquid supply opening 80 and ball valve 90 is connected with flapper valve 140 by a flexible element 142 having a length somewhat greater than the distance between ball valve 90 and flapper valve 140 in their closed positions. Flexible element 142 defines a lost motion connection between the two valves. A flexible chain or the like 144 connects a flushing handle 148 with flapper valve 140. Operation of flushing handle 148 opens flapper valve 140 to supply flushing liquid to flushing chamber 82 of FIG. 4 so that flushing liquid is supplied to both passages 60 and 70 for providing a relatively high velocity flow of flushing liquid through openings 62 and 72. This thoroughly flushes waste material from the upper surface of user platform 20 and also rinses splash shield 104 when it is in its horizontal position. Further movement of flushing handle 148 will elevate flapper valve 140 to a position wherein all of the slack is removed from flexible connecting element 142 so that ball valve 90 will be displaced upwardly to open inlet 92 to supply chamber 94 so that flushing liquid is also supplied to bowl passage 40 for entering bowl 22 through holes 42 and for supplying flushing liquid through passage 96 to discharge passage 48.

The toilet assembly may be suitably bolted to a floor or other supporting surface by extending bolts through holes recessed at the corners of band member 58.

The flushing means operates sequentially by first supplying flushing liquid across the upper surface of the user platform and then supplying flushing liquid to the bowl. This arrangement provides a higher velocity flow of flushing liquid for thoroughly rinsing the user platform and the splash shield before flushing liquid is supplied to the toilet bowl. The generally central opening 52 is substantially smaller than the open upper end of bowl 22. User platforms having openings of various sizes may be provided depending upon the size of the animal which will normally use the toilet.

Arranging separate passages 60, 70 as shown in FIGS. 7 and 8 insures a relatively high velocity flow of flushing liquid through holes 62 for thoroughly rinsing the inner surface of splash shield 104.

The invention has been shown and described with respect to a preferred embodiment. It is obvious that equivalent alterations and modifications will occur to others skilled in the art upon the reading and understanding of this specification. The present invention includes all such equivalent alterations and modifications, and is limited only by the scope of the claims.

Having thus described my invention, I claim:

1. A toilet comprising:
   (a) a user platform having an outer peripheral portion and a generally central opening; said user platform further having an upper surface sloping gradually downwardly from said outer peripheral portion toward said central opening;
   (b) flushing means for providing a flow of flushing liquid across said upper surface from adjacent said outer peripheral portion toward said central opening;
   (c) a waste receiving bowl beneath said user platform for receiving waste material passing through said opening in said user platform;
   (d) said flushing means providing a flow of flushing liquid to said bowl separate from the flow of flushing liquid supplied across said upper surface;
   (e) said flushing means providing sequential flow of flushing liquid across said upper surface of said user platform and then to said bowl;
   (f) said generally central opening in said user platform comprising a relatively narrow slot extending front to back across said user platform; and
   (g) said flushing means including a source of flushing liquid, a liquid supply passage extending around at least a portion of said user platform adjacent said outer peripheral portion thereof, and lateral openings extending from said liquid supply passage to open outwardly at said upper surface of said user platform.

2. The toilet as defined in claim 1 wherein an upright splash shield is positioned adjacent the front end of a user platform; said splash shield being pivotally attached to said toilet for movement between a generally horizontal storage position and a generally upright operative position, with said splash shield being received through a generally central opening in said user platform when said splash shield is in the generally horizontal storage position.

3. The toilet as defined in claim 1 wherein the flushing means is activated by a flushing valve that controls a tandem flapper valve and ball valve and as the flushing valve is moved to a first flush position, the flapper valve opens to permit flushing of the user platform and as moved to the second or final flush position, the ball valve opens to permit flushing of the bowl.

* * * * *